US012663670B2

(12) United States Patent
Takeno et al.

(10) Patent No.: US 12,663,670 B2
(45) Date of Patent: Jun. 23, 2026

(54) DISPLAY APPARATUS

(71) Applicant: DENSO TEN Limited, Kobe (JP)

(72) Inventors: Kiyoshi Takeno, Kobe (JP); Keiji Nebiki, Kobe (JP)

(73) Assignee: DENSO TEN Limited, Kobe (JP)

( * ) Notice: Subject to any disclaimer, the term of this patent is extended or adjusted under 35 U.S.C. 154(b) by 43 days.

(21) Appl. No.: 17/749,707

(22) Filed: May 20, 2022

(65) Prior Publication Data
US 2023/0101769 A1     Mar. 30, 2023

(30) Foreign Application Priority Data

Sep. 27, 2021     (JP) ................................. 2021-157252

(51) Int. Cl.
*G02F 1/1333*          (2006.01)
(52) U.S. Cl.
CPC .. *G02F 1/133325* (2021.01); *G02F 1/133331* (2021.01)
(58) Field of Classification Search
CPC ..................... G02F 1/133325; G02F 1/133331
See application file for complete search history.

(56) References Cited

U.S. PATENT DOCUMENTS

| | | | |
|---|---|---|---|
| 2007/0132906 A1* | 6/2007 | Shen | G02F 1/133308 |
| | | | 349/58 |
| 2018/0031899 A1* | 2/2018 | Kishida | G02B 6/005 |
| 2020/0096811 A1* | 3/2020 | Kwak | G02F 1/133308 |
| 2020/0257158 A1* | 8/2020 | An | G02F 1/133308 |

FOREIGN PATENT DOCUMENTS

| | | |
|---|---|---|
| JP | 2007-156491 A | 6/2007 |
| JP | 2010-134139 A | 6/2010 |
| JP | 2012-98393 A | 5/2012 |
| JP | 2015-34865 A | 2/2015 |
| JP | 2015-230402 A | 12/2015 |
| JP | 2018-017820 A | 2/2018 |
| JP | 2020-052199 A | 4/2020 |

* cited by examiner

*Primary Examiner* — Jennifer D. Carruth
*Assistant Examiner* — Agnes Dobrowolski
(74) *Attorney, Agent, or Firm* — Oliff PLC

(57) ABSTRACT

A display apparatus includes: a housing, a display panel, a cover panel, a first adhesive, the housed member, the second adhesive, and a protrusion. The display panel is arranged in a position corresponding to an opening of the housing, and has a front surface and a back surface. The cover panel covers the front surface. The first adhesive glues the housing and the cover panel together. The housed member is located adjacent to the back surface of the display panel and is housed in the housing. The second adhesive glues a rim portion of the back surface of the display panel and the housed member together. The protrusion is located on a portion of one of the housed member and the display panel, and protrudes toward the other of the housed member and the display panel. The portion corresponds to a location of the second adhesive on the other.

14 Claims, 16 Drawing Sheets

DISPLAY APPARATUS

BACKGROUND OF THE INVENTION

Field of the Invention

The invention relates to a display apparatus.

Description of the Background Art

Many display apparatuses have been conventionally proposed. Those display apparatuses include a display panel such as a liquid crystal panel and a backlight unit that is located on a back side of the display panel.

In some display apparatuses, the display panel and the backlight unit are glued together with an adhesive. In such a case, the adhesive prevents a foreign substance, such as dust, from entering between the display panel and the backlight unit. Thus, dust prevention can be improved.

However, the conventional technology needs to improve a configuration relating to the adhesive to be applied.

The adhesive described above is not limited to using to glue a display panel and a backlight unit together, but the adhesive may be used, for example, to glue a display panel of a display apparatus and a housed member that is a part, a unit, etc. to be housed in a housing of the display apparatus, together.

SUMMARY OF THE INVENTION

According to one aspect of the invention, a display apparatus includes: a housing, a display panel, a cover panel, a first adhesive, a housed member, a second adhesive, and a protrusion. The housing includes an opening. The display panel is arranged in a position corresponding to the opening of the housing, and the display panel has a front surface and a back surface that faces in an opposite direction than the front surface faces. The cover panel covers the front surface of the display panel. The first adhesive glues the housing and the cover panel together. The housed member is located adjacent to the back surface of the display panel and is housed in the housing. The second adhesive glues a rim portion of the back surface of the display panel and the housed member together. The protrusion is located on a portion of one of the housed member and the display panel, the position corresponding to a location of the second adhesive that is applied to the other of the housed member and the display panel, and the protrusion protruding toward the other of the housed member and the display panel.

An object of the invention is to provide a display apparatus that includes a proper configuration relating to an adhesive to be applied.

These and other objects, features, aspects and advantages of the invention will become more apparent from the following detailed description of the invention when taken in conjunction with the accompanying drawings.

DESCRIPTION OF THE EMBODIMENTS

With reference to the drawings, an embodiment of a display apparatus of the invention will be described below. The invention is not limited to the embodiment below.

Embodiment

Figure 1:
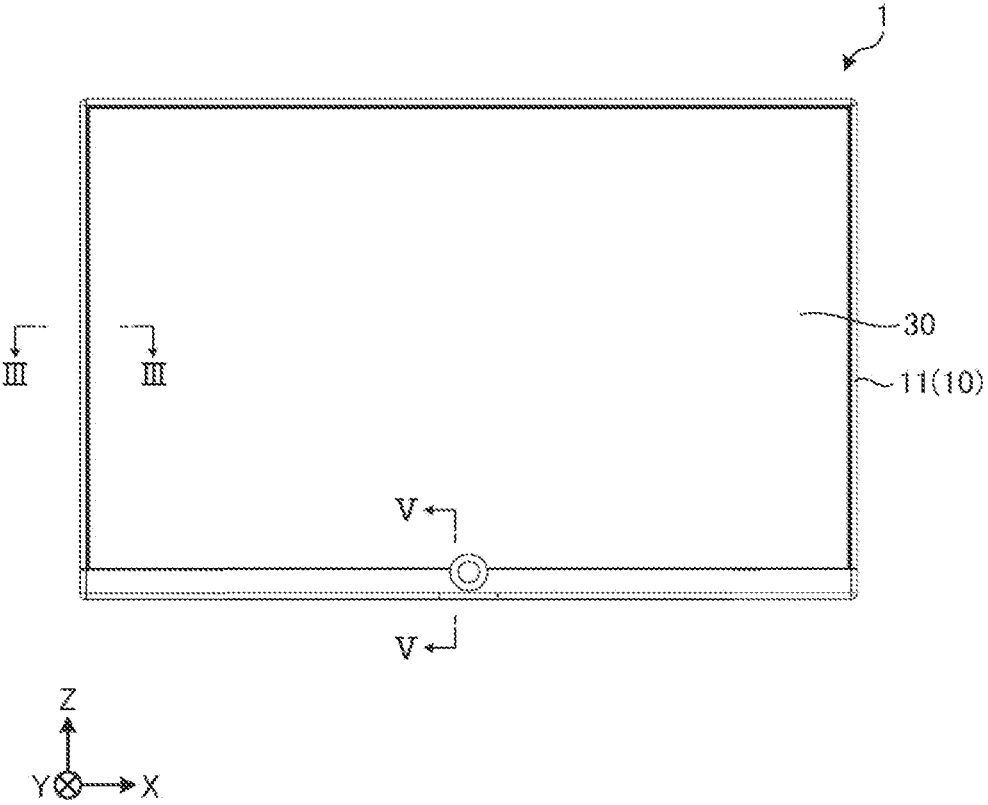
FIG. 1 is a front view of a display apparatus of this embodiment.

FIG. 1 is a front view of the display apparatus of the embodiment. FIG. 1 and subsequent drawings are schematic drawings.

Further, 3D Cartesian coordinates shown in FIG. 1 define, for easy understanding, an X-axis direction, a Y-axis direction and a Z-axis direction that are orthogonal to one another. The 3D Cartesian coordinates are shown in some subsequent drawings. The 3D Cartesian coordinates show the X-axis direction, the Y-axis direction and the Z-axis direction when the display apparatus 1 is arranged as shown in the drawings, and do not limit an installation direction, arrangement direction, etc. of the display apparatus 1.

As shown in FIG. 1, the display apparatus 1 is used as a vehicle mounted apparatus, such as a navigation apparatus and an audio apparatus. However, the display apparatus 1 is not limited to the vehicle mounted apparatus, and the display apparatus 1 may be any type of apparatuses that include a display function.

Figure 2:
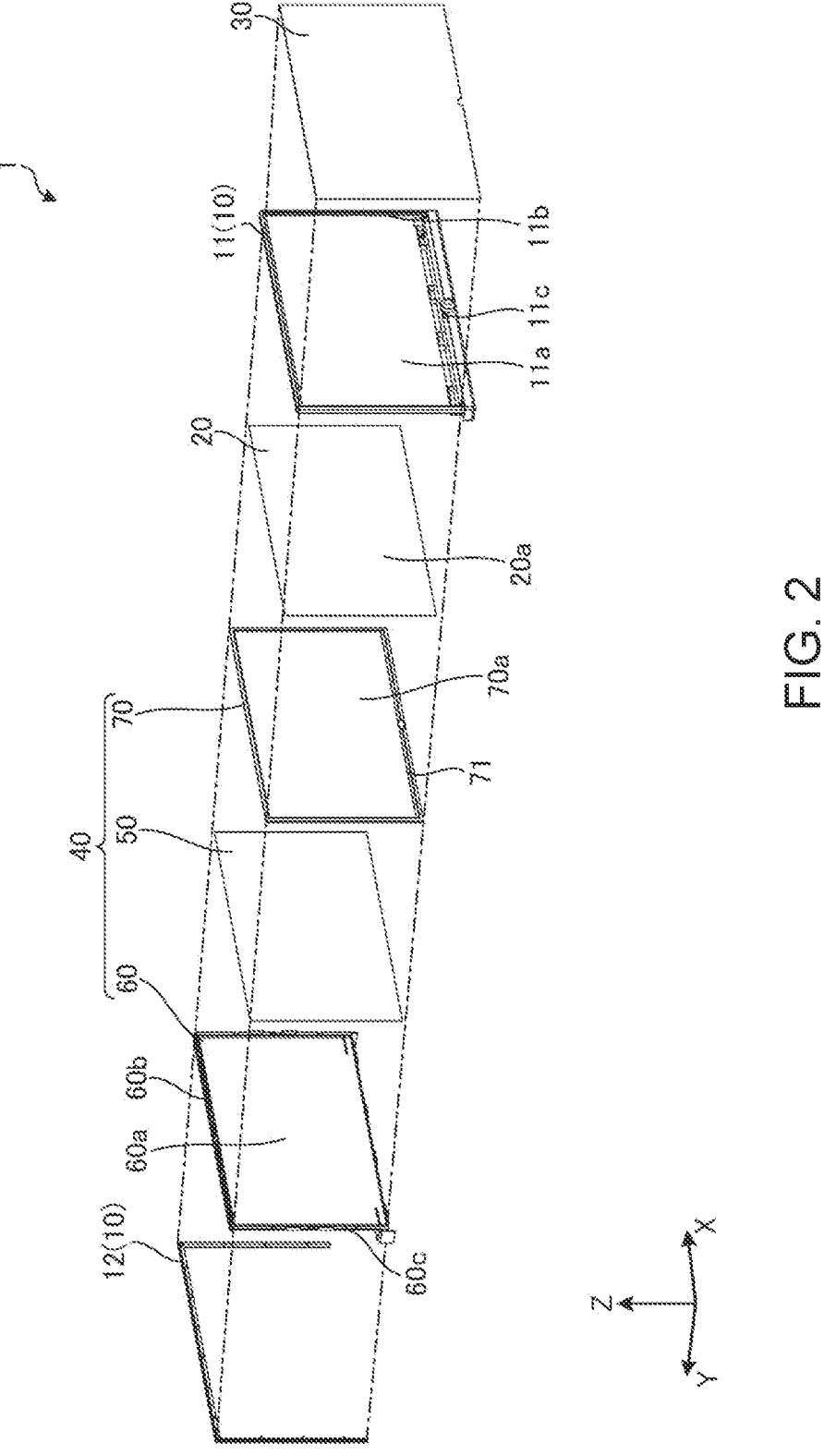
FIG. 2 is a disassembled perspective view of the display apparatus.
Figure 3:
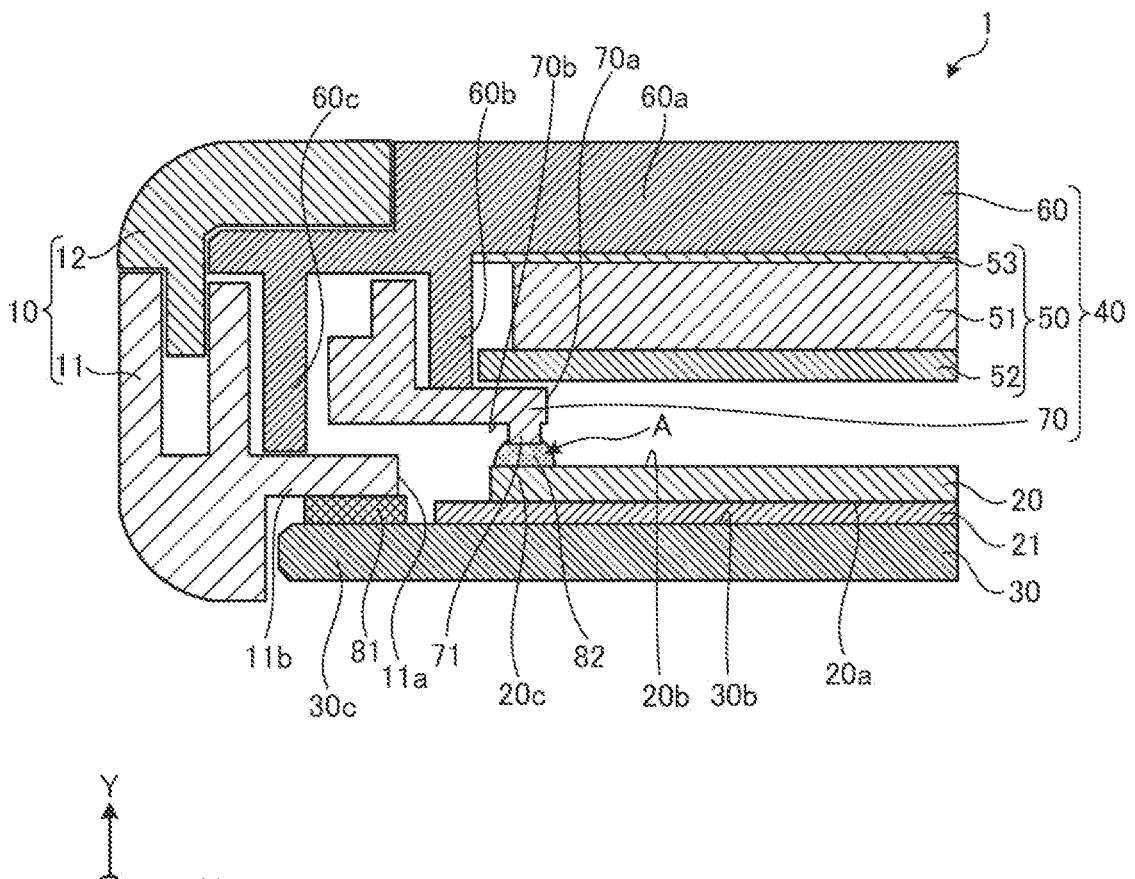
FIG. 3 is a cross-sectional view of the display apparatus along a line in FIG. 1.

The display apparatus 1 will be described below with reference to FIGS. 2 and 3. FIG. 2 is a disassembled perspective view of the display apparatus 1. FIG. 3 is a cross-sectional view of the display apparatus 1 along a line III-III in FIG. 1.

As shown in FIGS. 2 and 3, the display apparatus 1 includes a housing 10, a display panel 20, a cover panel 30, and a backlight unit 40.

The housing 10 includes an exterior panel 11 and a back member 12. The housing 10 is assembled with the exterior panel 11 and the back member 12 so that the housing 10 can house the display panel 20, the backlight unit 40, etc.

The exterior panel 11 is a frame-shaped member that includes an opening 11a in a center area. The exterior panel 11 is formed in a rectangle when viewed from a front of the exterior panel 11. The exterior panel 11 includes an adhesion surface 11*b* and an abutting portion 11*c*. The adhesion surface 11*b* is a rim portion of the opening 11*a*. The cover panel 30 and the adhesion surface 11*b* are glued together by a first adhesive 81 as described later (see FIG. 3).

The abutting portion 11*c* abuts the cover panel 30, and is formed, for example, on a lower portion of the exterior panel 11. A position of the cover panel 30 relative to the exterior panel 11 is determined by the abutting portion 11*c* that abuts the cover panel 30. Determination of the position of the cover panel 30 will be described later with reference to FIG. 5. A position in which the abutting portion 11*c* is formed is only an example and is not limited to the position in this embodiment.

The back member 12 is framed-shaped and located on a back side of the exterior panel 11 (a Y-axis positive side). As shown in FIG. 3, the back member 12 is fixed to the exterior panel 11 so as to sandwich the backlight unit 40 (more specifically a holder 60 described later).

The display panel 20 displays various types of information on a front surface 20*a* as a display surface. As the display panel 20, for example, a liquid crystal panel can be used. The display panel 20 is formed in a rectangle when viewed from a front of the display panel 20.

As shown in FIG. 3, the display panel 20 is arranged in a position corresponding to the opening 11*a* (more specifically the opening 11*a* of the exterior panel 11) of the housing 10. A joint portion 21 is formed on the front surface 20*a* of the display panel 20 to join the display panel 20 to the cover panel 30. In other words, the joint portion 21 is located between the display panel 20 and the cover panel 30. For example, translucent resin, such as OCR (Optical Clear Resin), may be used as the joint portion 21.

The cover panel 30 covers the front surface 20*a* of the display panel 20. The cover panel 30 is formed in a rectangle when viewed from a front of the cover panel 30. As the cover panel 30, for example, a cover glass that is made of a translucent material, such as glass, may be used.

Figure 4:
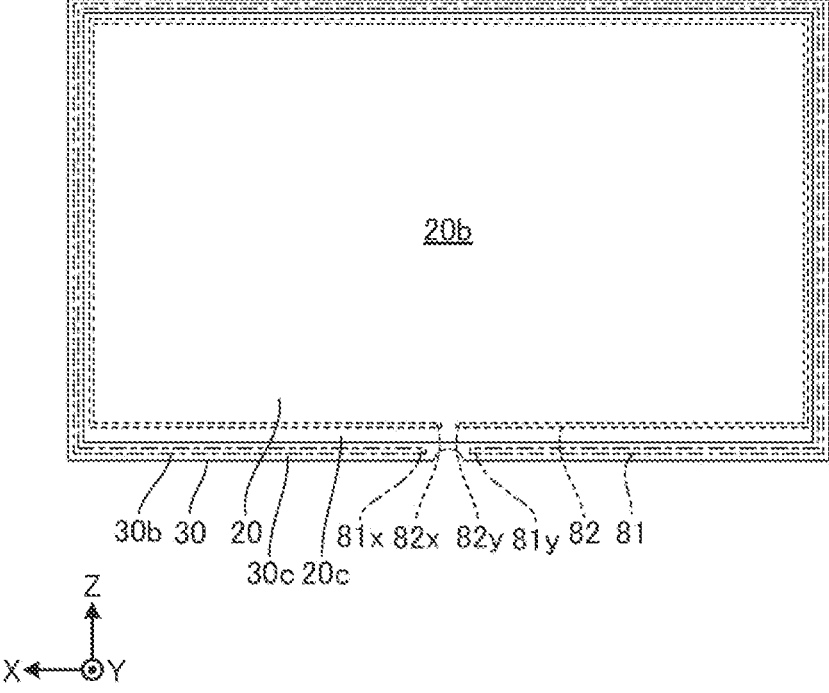
FIG. 4 is a back view of the display panel glued with the cover panel.

With reference to FIG. 4, the cover panel 30 will be described in more detail here. FIG. 4 is a back view of the display panel 20 glued to the cover panel 30.

As shown in FIG. 4, an area of the cover panel 30 is set to be greater than an area of the display panel 20 when viewed from a back (or the front) of the display panel 20. In other words, the cover panel 30 is formed such that when the cover panel 30 is glued to the display panel 20, a rim portion of the cover panel 30 is exposed from the display panel 20. The exposed rim portion of the cover panel 30 is also described as to "rim portion 30*c*" below.

The cover panel 30 and the exterior panel 11 (the housing 10. See FIG. 3) are glued together by the first adhesive 81, as described above. The first adhesive 81 is applied to the rim portion 30*c* of a back surface 30*b* of the cover panel 30. The first adhesive 81 is illustrated by a dashed line in FIG. 4.

More specifically, the first adhesive 81 is applied along the rim portion 30*c* of the cover panel 30. More specifically, the first adhesive 81 is applied so as to nearly go around along the rim portion 30*c* from a starting point 81*x*, for example, on a lower end of the cover panel 30 to an end point 81*y* on the lower end of the cover panel 30. Application of the first adhesive 81 starts from the starting point 81*x* and ends at the end point 81*y*. The end point 81*y* is a predetermined distance away from the starting point 81*x*. The predetermined distance between the starting point 81*x* and the end point 81*y* can be determined arbitrarily.

The cover panel 30 applied with the first adhesive 81 is fixed to the exterior panel 11 (the housing 10) while having the rim portion 30*c* facing the adhesion surface 11*b* of the exterior panel 11, as shown in FIG. 3. The first adhesive 81 glues the housing 10 (more specifically, the exterior panel 11) and the cover panel 30 together. The first adhesive 81 is a liquid adhesive that hardens after application. However, the first adhesive 81 is not limited to such an adhesive.

Determination of the position of the cover panel 30 relative to the exterior panel 11 will be described here. As described above, the abutting portion 11*c* (see FIG. 2) is formed on the exterior panel 11 and determines the position of the cover panel 30. The abutting portion 11*c* is formed, for example, between the starting point 81*x* and the end point 81*y* of the first adhesive 81, i.e., the abutting portion 11*c* is formed in a portion having no first adhesive 81.

In the foregoing description, the abutting portion 11*c* is formed between the starting point 81*x* and the end point 81*y* of the first adhesive 81. However, the position of the abutting portion 11*c* is not limited to the portion. In other words, at least one abutting portion 11*c* may be formed on each side of the exterior panel 11. In other words, a plurality of the abutting portions 11*c* may be formed on the exterior panel 11. The abutting portion 11*c* may be formed in an area in which the first adhesive 81 spreads. Thus, for example, the position of the cover panel 30 can be determined relative to the exterior panel 11, for example, while preventing the entire cover panel 30 from being inclined.

Figure 5:
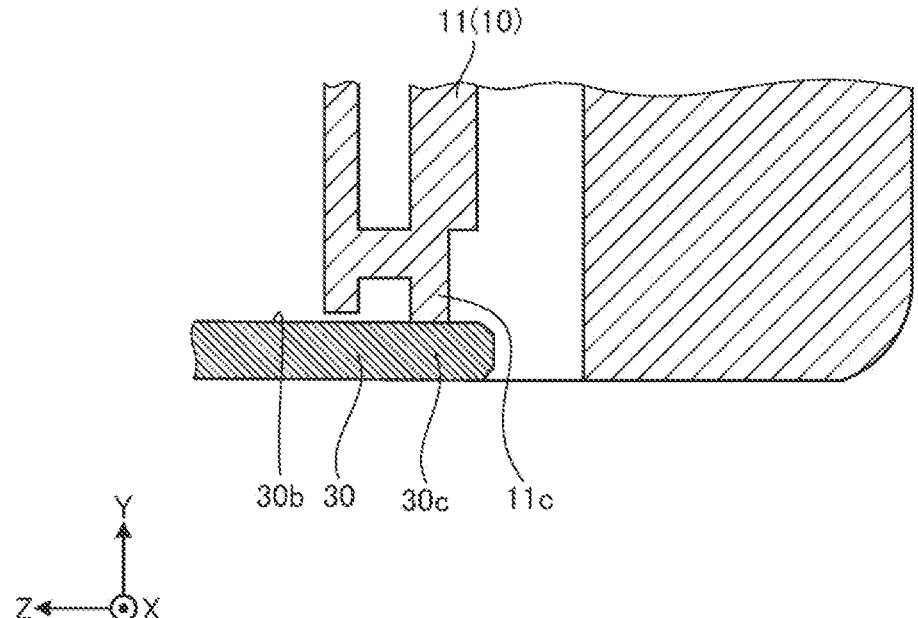
FIG. 5 is a cross-sectional view along a line V-V in FIG. 1.

The abutting portion 11*c* will be described with reference to FIG. 5. FIG. 5 is a cross-sectional view along a line V-V in FIG. 1 for explanation of the abutting portion 11*c* of the exterior panel 11. FIG. 5 is a simplified schematic view so that only the exterior panel 11 and the cover panel 30 are shown.

As shown in FIG. 5, the abutting portion 11*c* is formed so as to protrude toward the cover panel 30. More specifically, the abutting portion 11*c* is formed such that when the cover panel 30 and the exterior panel 11 are glued together, the abutting portion 11*c* protrudes toward the rim portion 30*c* of the cover panel 30 while the adhesion surface 11*b* faces the rim portion 30*c* (for those elements, see FIG. 3).

When the cover panel 30 and the exterior panel 11 are glued together, the abutting portion 11*c* of the exterior panel 11 abuts the rim portion 30*c* of the cover panel 30. Thus, movement of the cover panel 30 relative to the exterior panel 11 (or movement of the exterior panel 11 relative to the cover panel 30) is controlled, and the position of the cover panel 30 is determined relative to the exterior panel 11 (the housing 10).

By determining the position of the cover panel 30 relative to the exterior panel 11, a width of the cover panel 30 and the exterior panel 11 to be glued together is determined in a depth direction (the Y-axis direction). In a state in which the width is determined, the cover panel 30 and the exterior panel 11 are glued together by the first adhesive 81. Since the width of the cover panel 30 and the exterior panel 11 in the depth direction (the Y-axis direction) is determined by the position of the cover panel 30 determined by the abutting portion 11*c*, a space A is formed between the display panel 20 and the backlight unit 40, which will be described later.

Moreover, in the explanation above, the exterior panel 11 of the housing 10 includes the abutting portion 11*c*. However, a structure of the display apparatus 1 is not limited to that. For example, the cover panel 30 may include an abutting portion that abuts the exterior panel 11 of the housing 10 (not illustrated), and a position of the cover panel 30 may be determined by the abutting portion. In other words, the abutting portion of this embodiment may be formed on at least one of the cover panel 30 and the housing 10 and may abut the other of the cover panel 30 and the housing 10.

Next, the backlight unit 40 will be described with reference to FIGS. 2 and 3. The backlight unit 40 is located on a back surface 20b of the display panel 20 to irradiate the display panel 20 with light. The backlight unit 40 is an example of a member housed in the housing 10.

For example, the backlight unit 40 includes a backlight 50, a holder 60, and a frame 70. The backlight 50 includes a light guiding panel 51, a diffusion layer 52, and a reflective layer 53 as shown in FIG. 3.

The light guiding panel 51 is, for example, translucent and is formed in a shape of a board. The light guiding panel 51 irradiates the display panel 20 with incident light from a light source, not illustrated. The diffusion layer 52 is a sheet member and is provided, for example, on a side adjacent to (or near) the display panel 20, of the light guiding panel 51. The diffusion layer 52 diffuses the light irradiated from the light guiding panel 51. The reflective layer 53 is a sheet member and is provided, for example, a side opposite to the side adjacent to the display panel 20, of the light guiding panel 51. The reflective layer 53 reflects light of, for example, the light source or the light guiding panel 51 toward the display panel 20.

The holder 60 holds the backlight 50. For example, the holder 60 includes a flat board 60a, a wall 60b, and a convexity 60c. As shown in FIG. 2, the flat board 60a is a flat board member and is located adjacent to a back side of the backlight 50. The wall 60b stands from the flat board 60a, and is formed to surround the backlight 50. Thus, the backlight 50 is located in a space surrounded by the flat board 60a and the wall 60b.

The convexity 60c functions as a determiner of a position of the backlight unit 40 relative to the housing 10. More specifically, as shown in FIG. 3, for example, the convexity 60c is located on the flat board 60a so as to protrude toward the exterior panel 11 (a Y-axis negative direction) of the housing 10 from a position outer than a position in which the wall 60b is located.

As described above, the housing 10 is assembled such that the back member 12 and the exterior panel 11 sandwich the holder 60 of the backlight unit 40 to house the backlight unit 40. When the housing 10 is assembled, the convexity 60c of the holder 60 abuts the exterior panel 11 of the housing 10 (more specifically, a back surface of the adhesion surface 11b) to control movement of the backlight unit 40 relative to the housing 10. Thus, the position of the backlight unit 40 is determined relative to the housing 10.

A width of the backlight unit 40 and the housing 10 to be glued together is determined in the depth direction (the Y-axis direction), by determining the position of the backlight unit 40 relative to the housing 10. Thus, the space A is formed between the display panel 20 and the backlight unit 40, which will be described later.

The frame 70 is a frame-shaped member including an opening 70a in a center. The frame 70 is formed in a rectangle when viewed from a front of the frame 70. The frame 70 is attached to the holder 60 to be fixed. More specifically, the frame 70 is fixed to the wall 60b of the holder 60 in a position such that the light of the backlight 50 goes through the opening 70a.

The backlight unit 40 that is configured as described above is glued to the display panel 20 by a second adhesive 82. More specifically, the frame 70 of the backlight unit 40 is glued to the display panel 20 by the second adhesive 82.

The second adhesive 82 described above is applied to the display panel 20. Here described with reference to FIG. 4 is a location of the display panel 20 to which the second adhesive 82 is applied. In FIG. 4, the second adhesive 82 is shown by a dashed line.

As shown in FIG. 4, the second adhesive 82 is applied to a rim portion 20c of the back surface 20b of the display panel 20.

More specifically, the second adhesive 82 is applied along the rim portion 20c of the display panel 20. More specifically, the second adhesive 82 is applied so as to nearly go around along the rim portion 20c from a starting point 82x on a lower end of the display panel 20 to an end point 82y on the lower end of the display panel 20. Application of the second adhesive 82 starts from the starting point 82x and ends at the end point 82y. The end point 82y is a predetermined distance away from the starting point 82x. The predetermined distance between the starting point 82x and the end point 82y can be determined arbitrarily.

The display panel 20 applied with the second adhesive 82, as shown in FIG. 3, is fixed to the backlight unit 40 (more specifically, a front surface 70b of the frame 70), while having the rim portion 20c of the back surface 20b facing the backlight unit 40. As described above, the second adhesive 82 is for gluing the backlight unit 40 and the rim portion 20c of the back surface 20b of the display panel 20 together. The second adhesive 82 is a liquid adhesive that hardens after application. However, the second adhesive 82 is not limited to such an adhesive.

As described above, in the display apparatus 1 of this embodiment, the display panel 20 and the backlight unit 40 are glued together by the second adhesive 82. Thus, for example, the second adhesive 82 prevents a foreign substance, such as dust, from entering between the display panel 20 and the backlight unit 40. Thus, dust prevention of the display apparatus 1 can be improved.

Further, in this embodiment, the second adhesive 82 is used to improve the dust prevention. Thus, a width of the display apparatus 1 in the depth direction (the Y-axis direction) can be smaller. In other words, for example, if the display apparatus 1 is configured to have a spacer made of a resilient material, such as a sponge, between the display panel 20 and the backlight unit 40, instead of the second adhesive 82, the spacer needs to be pressed by a certain load to seal between the display panel 20 and the backlight unit 40. However, a load to be applicable to the display panel 20, etc. is limited due to fragility of the display apparatus 1 or for another reason. The spacer needs to a certain thickness in the depth direction (the Y-axis direction) in order to seal between the display panel 20 and the backlight unit 40 by applying a limited load. As a result, there is a possibility that the display apparatus 1 cannot be thinner.

In this embodiment, since the second adhesive 82 is used, the second adhesive 82 can seal between the display panel 20 and the backlight unit 40 regardless of the load applied on the display panel 20, etc. Further, the width of the display apparatus 1 in the depth direction can be thinner by adjusting a width of the second adhesive 82 in the depth direction.

Further, in this embodiment, since the second adhesive 82 is used, the second adhesive 82 can glue the display panel 20 and the backlight unit 40 with a relatively small load. As a result, flexibility in determining the width of the display apparatus 1 in the depth direction can be improved because the width of the display apparatus 1 in the depth direction includes the width of the second adhesive 82 in the depth direction. Further, since the second adhesive 82 is used instead of the spacer, this embodiment can reduce cost as compared with a case in which the spacer is used.

The second adhesive 82 may be same as (identical to) the first adhesive 81 described above. For example, a modified silicone adhesive may be used as the first adhesive 81 and the second adhesive 82. However, the first and second adhesives 81, 82 are not limited to the modified silicone adhesive. An acrylic adhesive, an epoxy adhesive or another type of adhesive may be used.

Thus, for example, a manufacturing time period of the display apparatus 1 can be reduced. In other words, in this embodiment, since the second adhesive 82 is identical to the first adhesive 81, for example, an application time period of those adhesives can be reduced because the first adhesive 81 and the second adhesive 82 can be applied at one application process. Thus, the manufacturing time period of the display apparatus 1 can be reduced.

A configuration relating to the second adhesive 82 will be further described. As shown in FIG. 3, a clearance between the display panel 20 and the backlight unit 40 (more specifically, the frame 70) is relatively small. Thus, there is a possibility that a contact area of the second adhesive 82 with the display panel 20 and/or the backlight unit 40 is greater without intention. For example, there is a possibility that the second adhesive 82 between the display panel 20 and the backlight unit 40 may spread beyond a predetermined application area in an assembling of the display apparatus 1.

Thus, this embodiment achieves a proper configuration relating to the second adhesive 82 to prevent the second adhesive 82 from spreading beyond the predetermined application area.

Figure 6:
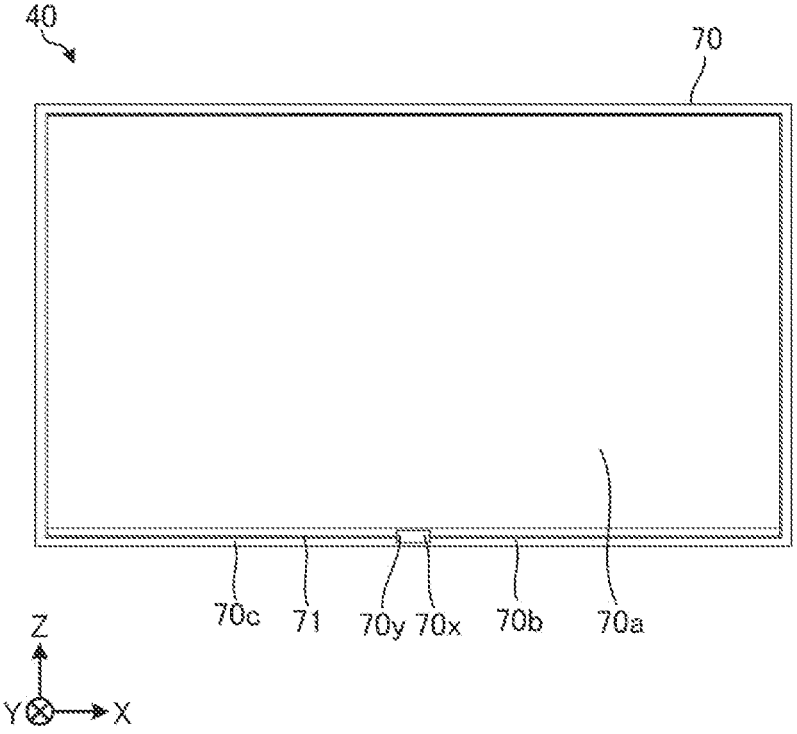
FIG. 6 is a front view of a frame of a backlight unit.
Figure 7:
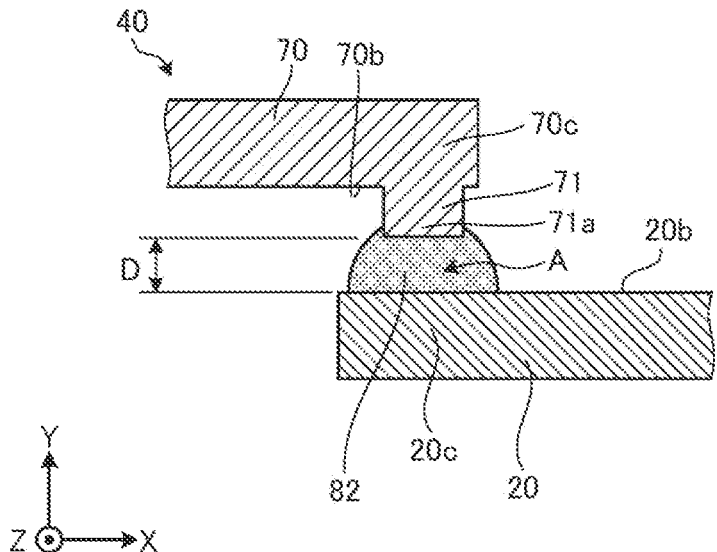
FIG. 7 is an enlarged cross-sectional view that shows a vicinity of a second adhesive.

This configuration will be described below with reference to FIGS. 3, 6, and 7. FIG. 6 is a front view of the frame 70 of the backlight unit 40. FIG. 7 is an enlarged cross-sectional view that shows a vicinity of the second adhesive 82. Only the second adhesive 82, the display panel 20, and the frame 70 are shown for easy understanding.

As shown in FIGS. 3, 6, and 7, the backlight unit 40 includes a protrusion 71. For example, as shown in FIGS. 3 and 7, the protrusion 71 is formed on a portion corresponding to a location of the second adhesive 82, on the frame 70 of the backlight unit 40 so as to protrude toward the display panel 20. More specifically, the protrusion 71 is formed in the portion on the frame 70 that faces the rim portion 20*c* to be applied with the second adhesive 82 and protrudes toward the rim portion 20*c* of the display panel 20.

The protrusion 71 is formed such that a cross-section of the protrusion 71 in a protruding direction (the Y-axis direction) of the protrusion 71 is rectangular. As shown in FIG. 7, the protrusion 71 is formed such that a tip portion 71*a* is in contact with the second adhesive 82 in a state in which the display panel 20 is fixed to the backlight unit 40. Thus, the second adhesive 82 in contact with the protrusion 71 (more specifically the tip portion 71*a*) seals between the display panel 20 and the backlight unit 40.

As described above, in this embodiment, the backlight unit 40 includes the protrusion 71. Thus, for example, the contact area of the second adhesive 82 with the backlight unit 40 can be reduced. When the backlight unit 40 and the display panel 20 are glued together, if a load from the backlight unit 40 or the like is applied to the second adhesive 82, the second adhesive 82 is less likely to spread because the contact area of the second adhesive 82 with the backlight unit 40 is reduced. In other words, the configuration relating to the second adhesive 82 to be applied includes the protrusion 71 in this embodiment. Thus, the second adhesive 82 is prevented from spreading beyond the predetermined area.

The protrusion 71 is a rib that extends along a circumferential direction of the backlight unit 40, as shown in FIG. 6 and other drawings. More specifically, a rim portion 71*c* is formed on a rim portion of the opening 70*a* of the frame 70 of the backlight unit 40. The protrusion 71 is the rib extending along the rim portion 71*c* of a front surface 71*b* of the frame 70.

Since the protrusion 71 of this embodiment is the rib as described above, the second adhesive 82 is prevented from spreading beyond the predetermined area on the portion (the rim portion 71*c*) of the backlight unit 40 in the circumferential direction. Further, since the protrusion 71 is the rib, the protrusion 71 can be easily formed.

As shown in FIGS. 3 and 7, the space A is generated between the display panel 20 and the backlight unit 40. More specifically, the space A having a distance D is formed between the protrusion 71 of the backlight unit 40 and the display panel 20 (more specifically, between the tip portion 71*a* of the protrusion 71 and the rim portion 20*c* of the back surface 20*b* of the display panel 20). In other words, the protrusion 71 and the display panel 20 are formed such that when the backlight unit 40, the display panel 20, etc. are fixed, the backlight unit 40 does not touch (abut) the display panel 20. The second adhesive 82 described above is positioned in the space A.

As described above, in this embodiment, the space A is formed between the protrusion 71 and the display panel 20. Thus, for example, when the display panel 20 and the backlight unit 40 are glued together, it is possible to effectively prevent an excessive load from being applied from the protrusion 71 to the second adhesive 82 that is applied to the display panel 20. Therefore, the second adhesive 82 is further prevented from spreading beyond the predetermined area.

The positions of the cover panel 30 and the housing 10 are determined by the foregoing abutting portion 11*c* (see FIG. 5), and the positions of the backlight unit 40 and the housing 10 are determined by the convexity 60*c* (see FIG. 3). Thus, the space A is formed. Accordingly, it is possible to form the space A surely in this embodiment.

More specifically, as described above, the positions of the cover panel 30 and the housing 10 (more specifically the exterior panel 11) are determined by the abutting portion 11*c* (see FIG. 5) so that the width of the cover panel 30 and the housing 10 to be glued together in the depth direction (the Y-axis direction) is determined. As described above, the positions of the backlight unit 40 and the housing 10 are determined by the convexity 60*c* so that a width of the backlight unit 40 and the housing 10 in the depth direction (the Y-axis direction) is determined.

Here, since the display panel 20 that forms one side of the space A is glued to the cover panel 30 of which the position is determined, the position of the display panel 20 in the depth direction is also determined. Since the protrusion 71 that forms another side of the space A is provided to the backlight unit 40 of which the position is determined. Accordingly, the position of the protrusion 71 in the depth direction is determined.

As described above, in this embodiment, since the positions of the display panel 20 and the protrusion 71 in the depth direction are determined by the positions determined by the abutting portion 11*c* (see FIG. 5), the convexity 60*c* (see FIG. 3), etc., the space A is surely formed between the display panel 20 and the protrusion 71.

Figure 8A:
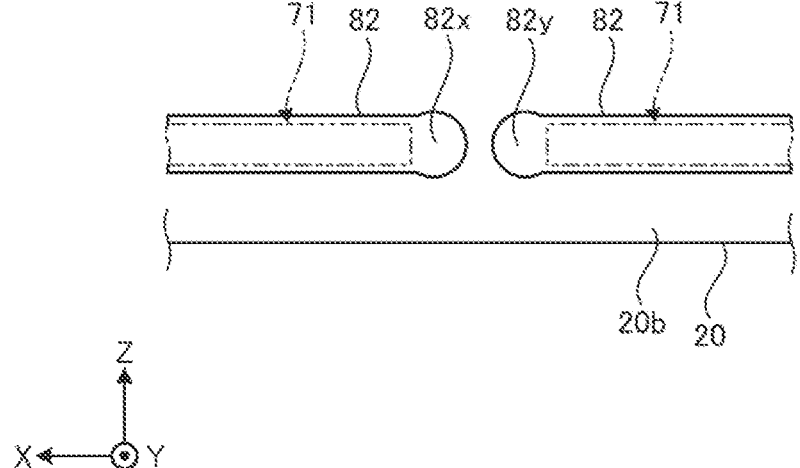
FIG. 8A is a back view of the display panel.
Figure 8B:
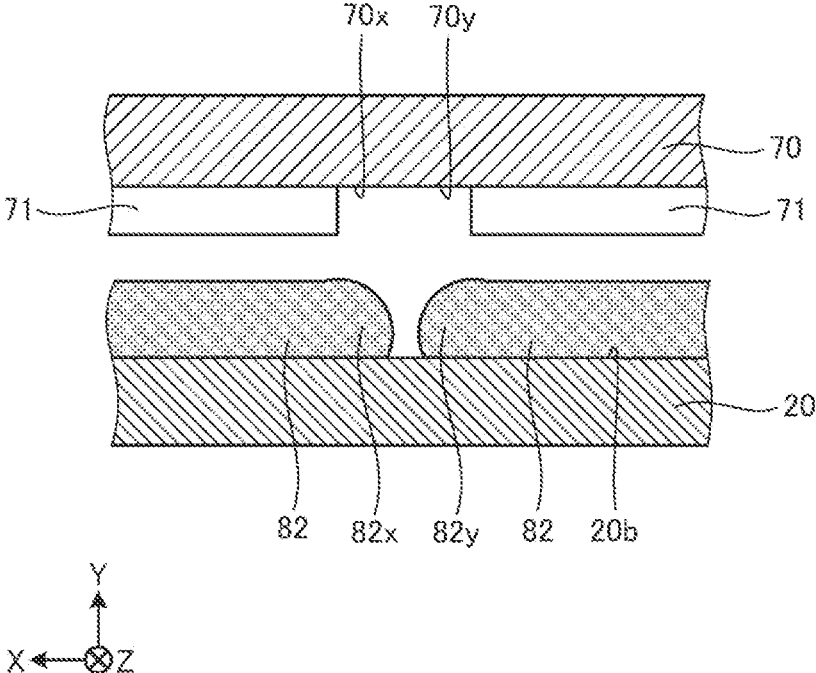
FIG. 8B is a side view of a vicinity of a starting point and an end point of the second adhesive applied to the display panel.

With reference to FIGS. 8A and 8B, next described is a shape of the protrusion 71 in a vicinity of the starting point 82*x* and the end point 82*y* of the foregoing second adhesive 82 (see FIG. 4). FIG. 8A is a back view of the display panel 20. More specifically, FIG. 8A shows the vicinity of the starting point 82x and the end point 82y of the second adhesive 82 applied to the display panel 20. In FIG. 8A, the protrusion 71 in the vicinity of the starting point 82x and the end point 82y is illustrated by an imaginary line, for convenience. FIG. 8B is a side view of the vicinity of the starting point 82x and the end point 82y of the second adhesive 82 applied to the display panel 20. For easy understanding, FIG. 8B shows the display panel 20 and the frame 70 that are not glued together.

The second adhesive 82 that is applied to the display panel 20 will be described below before the shape of the protrusion 71 is described. As described above, the starting point 82x is a point from which the application of the second adhesive 82 starts, and the end point 82y is a point at which the application of the second adhesive 82 ends. Due to a characteristic of an application process, an application amount of the second adhesive 82 is likely greater in the starting point 82x and/or the end point 82y, as compared to a point other than the starting and end points 82x, 82y, as shown in FIGS. 8A and 8B.

When the protrusion 71 touches the starting point 82x or the end point 82y that has the relatively large application amount, in the assembling, the second adhesive 82 may spread beyond the predetermined area in the vicinity of the starting point 82x or the end point 82y.

Therefore, in this embodiment, the protrusion 71 is not formed in portions 70x and 70y (see FIG. 8B) corresponding to the starting point 82x and the end point 82y, respectively. More specifically, the protrusion 71 is not formed between the portion 70x corresponding to the starting point 82x of the second adhesive 82 and the portion 70y corresponding to the end point 82y of the second adhesive 82.

Thus, even in a case where the application amount of the second adhesive 82 is relatively large in the starting point 82x and/or the end point 82y, the protrusion 71 does not touch the starting point 82x or the end point 82y in the assembling. The load that is applied from the protrusion 71 has less effect so that the second adhesive 82 can be prevented from spreading beyond the predetermined area in the vicinity of the starting and end points 82x, 82y.

In the embodiment described above, the backlight unit 40 includes the protrusion 71. However, the configuration is not limited to that. For example, the display panel 20 may be configured to include a protrusion, not illustrated. In other words, the protrusion in this embodiment may be formed on a portion corresponding to a location of the second adhesive 82, on at least one of the backlight unit 40 and the display panel 20 to protrude toward the other of the backlight unit 40 and the display panel 20.

As described above, the display apparatus 1 of this embodiment includes the housing 10, the display panel 20, the cover panel 30, the first adhesive 81, the backlight unit 40 (an example of a housed member), the second adhesive 82, and the protrusion 71. The housing 10 includes opening 11a. The display panel 20 is arranged in the position corresponding to the opening 11a of the housing 10. The cover panel 30 covers the front surface 20a of the display panel 20. The first adhesive 81 glues the housing 10 and the cover panel 30 together. The backlight unit 40 is located on the side adjacent to (or near) the back surface 20b of the display panel 20 and is housed in the housing 10. The second adhesive 82 glues the backlight unit 40 and the rim portion 20c of the back surface 20b of the display panel 20 together. The protrusion 71 is located, on at least one of the backlight unit 40 and the display panel 20, on the portion corresponding to the location of the second adhesive 82 on the other of the backlight unit 40 and the display panel 20, and protrudes toward the other of the backlight unit 40 and the display panel 20. Thus, the configuration relating to the second adhesive 82 to be applied can be proper.

A same adhesive is used for the first adhesive 81 and the second adhesive 82. Thus, the configuration relating to the second adhesive 82 to be applied can be proper.

<First Modification>

Figure 9A:
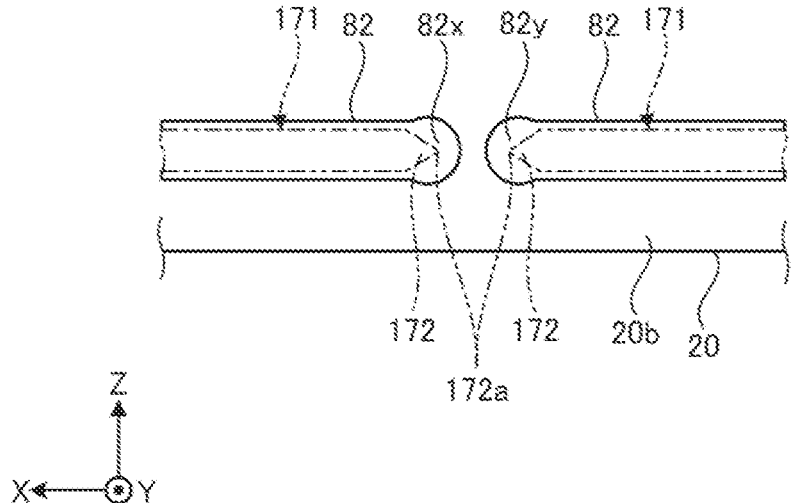
FIG. 9A is a back view of a display panel of a first modification.
Figure 9B:
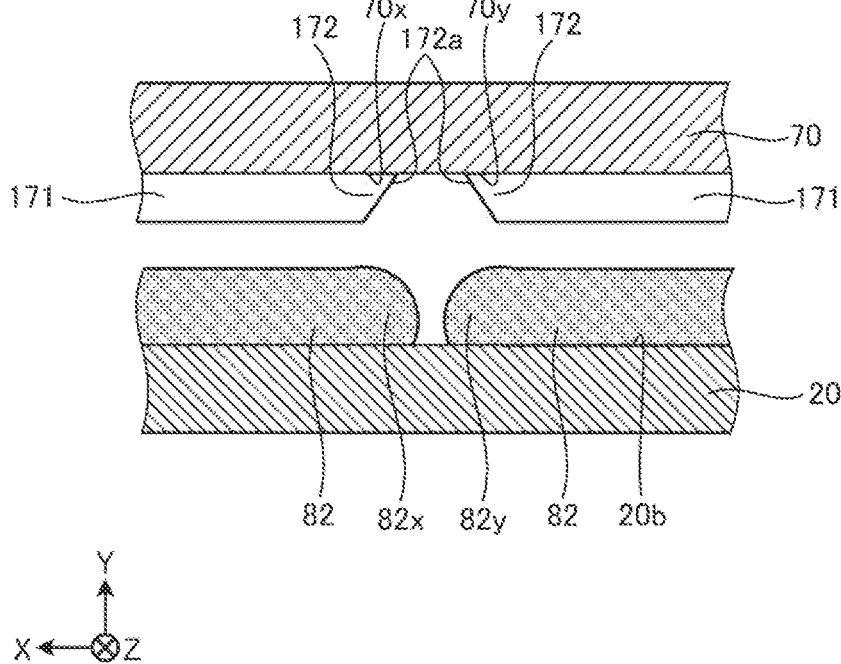
FIG. 9B is a side view of a vicinity of a starting point and an end point of a second adhesive applied to the display panel of the first modification.

Next, a modification of the protrusion 71 will be described with reference to FIGS. 9A to 13. FIG. 9A is a back view of a display panel 20 of the first modification. FIG. 9B is a side view of a vicinity of a starting point 82x and an end point 82y of a second adhesive 82 applied to the display panel 20 of the first modification. FIGS. 9A and 9B correspond to FIGS. 8A and 8B, respectively.

As shown in FIGS. 9A and 9B, in the first modification, a protrusion 171 is formed such that a shape of the protrusion 171 in portions 70x and 70y (see FIG. 9B) is different from a shape of the protrusion 171 in positions (portions) other than the portions 70x and 70y. The portion 70x corresponds to the starting point 82x of the second adhesive 82, and the portion 70y corresponds to the end point 82y of the second adhesive 82.

For example, the protrusion 171 of the first modification includes tip portions 172. The tip portions 172 are formed in the portions 70x and 70y corresponding to the starting point 82x and the end point 82y, respectively, of the second adhesive 82 on the display panel 20.

For example, the tip portions 172 are formed such that a width of the tip portions 172 is smaller (tapered) toward an end portion 172a in a longitudinal direction (a Z-axis direction), as shown in FIG. 9A. The tip portions 172 are formed, as shown in FIG. 9B, such that a width of the tip portions 172 in a depth direction (a Y-axis direction), i.e., a protruding height of the protrusion 171 is smaller toward the end portion 172a.

Thus, in the first embodiment, since a contact area of the protrusion 171 with the starting point 82x and/or the end point 82y of the second adhesive 82 can be smaller in an assembling of the display apparatus 1, if an application amount of the second adhesive 82 is relatively large in the starting point 82x and/or the end point 82y, the second adhesive 82 can be prevented from spreading beyond a predetermined area in the vicinity of the starting point 82x and the end point 82y.

<Second Modification>

Figure 10A:
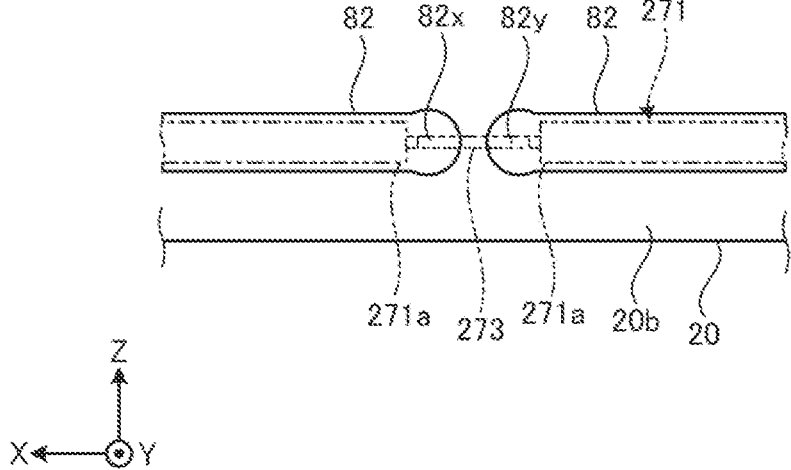
FIG. 10A is a back view of a display panel of a second modification.
Figure 10B:
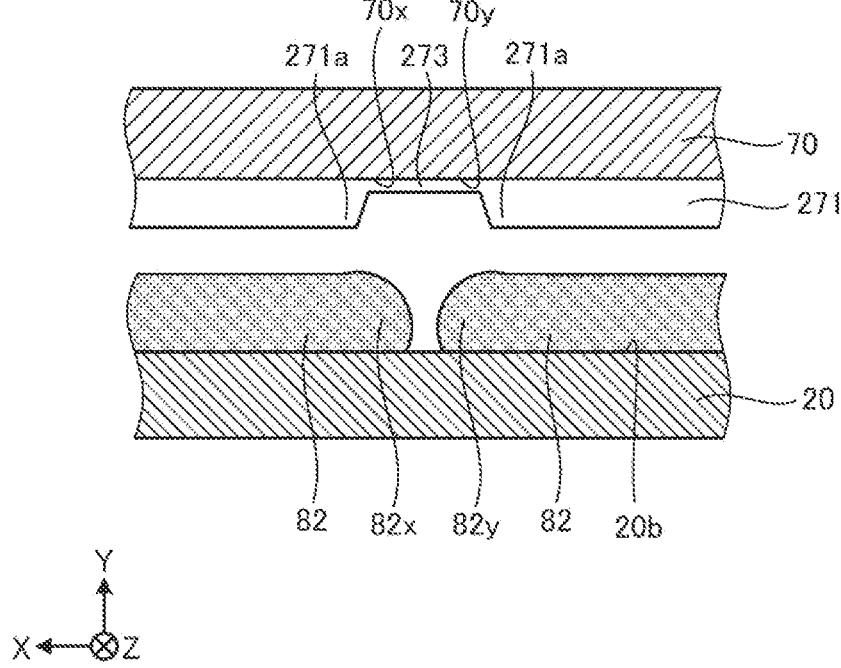
FIG. 10B is a side view of a vicinity of a starting point and an end point of a second adhesive applied to the display panel of the second modification.

Next, a second modification will be described below with reference to FIGS. 10A and 10B. FIG. 10A is a back view of a display panel 20 of the second modification, and FIG. 10B is a side view of a vicinity of a starting point 82x and an end point 82y of a second adhesive 82 applied to the display panel 20 of the second modification. FIGS. 10A and 10B correspond to FIGS. 8A and 8B.

As shown in FIGS. 10A and 10B, in the second modification, a protrusion 271 is formed such that a shape of the protrusion 271 in portions 70x and 70y (see FIG. 10B) is different from a shape of the protrusion 271 in positions (portions) other than the portions 70x and 70y. The portion 70x corresponds to the starting point 82x of the second adhesive 82, and the portion 70y corresponds to the end point 82y of the second adhesive 82.

For example, the protrusion 271 of the second modification includes a coupler 273. The coupler 273 is formed in the portions 70x and 70y corresponding to the starting point 82x and the end point 82$y$, respectively, of the second adhesive 82 on a display panel 20 to couple end portions 271$a$ of the protrusion 271.

For example, the coupler 273 is formed as shown in FIG. 10A such that a width of the coupler 273 is smaller than a width of the end portions 271$a$ of the protrusion 271 in a longitudinal direction (a Z-axis direction). Further, the coupler 273 is formed as shown in FIG. 10B such that the width of the coupler 273 in a depth direction (a Y-axis direction) is smaller than a width of the end portions 271$a$ of the protrusion 271. In other words, the coupler 273 of the protrusion 271 is formed so as to have a protruding height smaller than a protruding height of the end portions 271$a$.

Thus, in the second modification, since a contact area of the protrusion 271 with the starting point 82$x$ and/or the end point 82$y$ of the second adhesive 82 can be smaller in an assembling of the display apparatus 1, if an application amount of the second adhesive 82 is relatively large in the starting point 82$x$ and/or the end point 82$y$, the second adhesive 82 can be prevented from spreading beyond a predetermined area in the vicinity of the starting point 82$x$ and the end point 82$y$.

<Third Modification to Fifth Modification>

Figure 11:
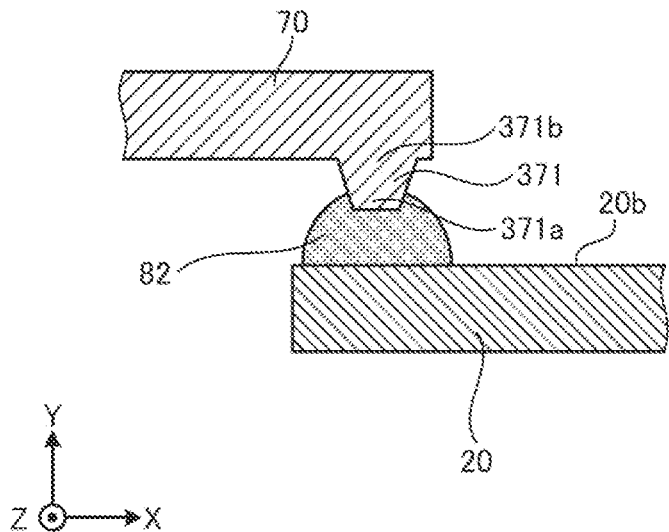
FIG. 11 is an enlarged cross-sectional view of a protrusion and a vicinity of a second adhesive of a third modification.
Figure 12:
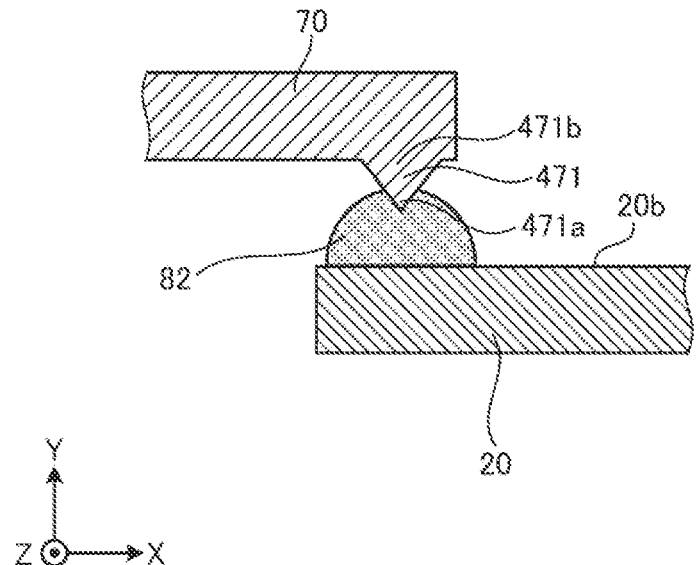
FIG. 12 is an enlarged cross-sectional view of a protrusion and a vicinity of a second adhesive of a fourth modification.
Figure 13:
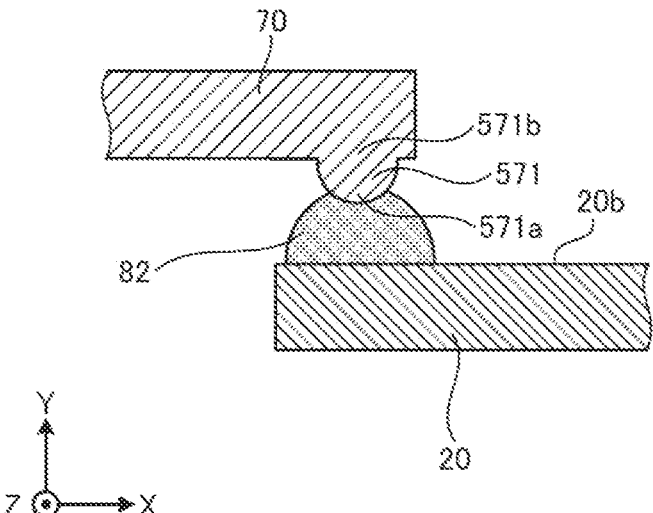
FIG. 13 is an enlarged cross-sectional view of a protrusion and a vicinity of a second adhesive of a fifth modification.

Next, third, fourth and fifth modifications will be described below with reference to FIGS. 11 to 13. FIG. 11 is an enlarged cross-sectional view of a protrusion 371 and a vicinity of a second adhesive 82 of the third modification. FIG. 12 is an enlarged cross-sectional view of a protrusion 471 and a vicinity of a second adhesive 82 of the fourth modification. FIG. 13 is an enlarged cross-sectional view of a protrusion 571 and a vicinity of a second adhesive 82 of the fifth modification.

As shown in FIG. 11, the protrusion 371 of the third modification is formed such that the protrusion 371 has a tip portion 371$a$ of which a width is smaller than a width of a base portion 371$b$ in a cross-section of the protrusion 371 in a protruding direction (a Y-axis direction) of the protrusion 371. For example, the protrusion 371 is formed such that the cross-section of the protrusion 371 is in a shape of a trapezoid in the protruding direction.

The protrusion 471 of the fourth modification is formed as shown in FIG. 12 such that the protrusion 471 has a tip portion 471$a$ of which a width is smaller than a width of a base portion 471$b$ in a cross-section of the protrusion 471 in a protruding direction (a Y-axis direction) of the protrusion 471. For example, the protrusion 471 is formed such that the cross-section of the protrusion 471 is in a shape of a triangle in the protruding direction.

The protrusion 571 of the fifth modification is formed as shown in FIG. 13 such that the protrusion 571 has a tip portion 571$a$ of which a width is smaller than a width of a base portion 571$b$ in a cross-section of the protrusion 571 in a protruding direction (a Y-axis direction) of the protrusion 571. For example, the protrusion 571 is formed such that the cross-section of the protrusion 571 is in a shape of a hemisphere in the protruding direction.

In the third to fifth modifications, since the protrusions 371, 471, and 571 are configured as described above, in the assembling of the display apparatus 1, a contact area of each of protrusions 371, 471, and 571 with a starting point 82$x$ and/or an end point 82$y$ of a second adhesive 82 can be smaller. Even if an application amount of the second adhesive 82 is relatively large, for example, in the starting point 82$x$ and the end point 82$y$, the second adhesive 82 can be prevented from spreading beyond a predetermined area in a vicinity of the starting point 82$x$ and the end point 82$y$.

The foregoing embodiment and the first to fifth modifications may be combined properly with one another. For example, a cross-section of the coupler 273 of the protrusion 271 may be trapezoid shaped by combining the third and fourth modifications.

More effects and modifications can be produced by those skilled in the art. Thus, the invention is not limited to the detailed and specific embodiment and modifications described above. Many modifications are possible without departing from the scope of the invention defined by claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A display apparatus comprising:
a housing that includes an opening;
a display panel that is arranged in a position corresponding to the opening of the housing, the display panel having a front surface and a back surface that faces in an opposite direction than the front surface faces;
a cover panel that covers the front surface of the display panel;
a first adhesive that glues a first surface of the housing to a second surface of the cover panel to glue the housing and the cover panel together;
a housed member that is located adjacent to the back surface of the display panel and is housed in the housing;
a second adhesive that glues a rim portion of the back surface of the display panel and the housed member together; and
a protrusion that is provided on a portion of the housed member that faces the rim portion of the back surface of the display panel, the protrusion protruding toward the rim portion, and the second adhesive being disposed between the protrusion and the rim portion of the back surface of the display panel, wherein
the protrusion is not located in positions corresponding to a starting point from which application of the second adhesive starts and an end point at which the application of the second adhesive ends, and the protrusion is not located in a gap between the starting point and the end point of the second adhesive.

2. The display apparatus according to claim 1, wherein the protrusion is a rib that extends along a circumferential direction of the housed member.

3. The display apparatus according to claim 1, wherein a space is formed between the protrusion and the rim portion of the back surface of the display panel, and the second adhesive is positioned in the space.

4. The display apparatus according to claim 3, further comprising:
an abutting portion that is located on at least one of the second surface of the cover panel and the first surface of the housing that are glued to each other by the first adhesive, the abutting portion projecting from the one of the first and second surfaces and abutting the other of the first and second surfaces, wherein
the cover panel is joined to the display panel, and
relative positions of the cover panel and the housing are determined by the abutting portion abutting the other of the second surface of the cover panel and the first surface of the housing so that the space is formed between the protrusion and the rim portion of the back surface of the display panel, the second adhesive being located in the space.

5. The display apparatus according to claim 1, wherein the protrusion has a tip portion and a base portion, and a width of the tip portion is smaller than a width of the base portion in a cross-section in a protruding direction of the protrusion.

6. The display apparatus according to claim 5, wherein the protrusion is formed such that the cross-section in the protruding direction of the protrusion is in a shape of a trapezoid, a triangle or a hemisphere.

7. The display apparatus according to claim 1, wherein the first adhesive is identical to the second adhesive.

8. The display apparatus according to claim 1, wherein the housed member is a backlight unit that includes a frame and irradiates the display panel with light, and the second adhesive glues the rim portion of the back surface of the display panel and the frame of the backlight unit together.

9. The display apparatus according to claim 1, wherein a portion of a back surface of the cover panel is adhered to the front surface of the display panel by an optically clear resin.

10. The display apparatus according to claim 1, wherein a width of the second adhesive is greater than a width of the protrusion.

11. A display apparatus comprising:

a housing that includes an opening;

a display panel that is arranged in a position corresponding to the opening of the housing, the display panel having a front surface and a back surface that faces in an opposite direction than the front surface faces;

a cover panel that covers the front surface of the display panel;

a first adhesive that glues a first surface of the housing to a second surface of the cover panel to glue the housing and the cover panel together;

a housed member that is located adjacent to the back surface of the display panel and is housed in the housing;

a second adhesive that glues a rim portion of the back surface of the display panel and the housed member together; and a protrusion that is provided on a portion of the housed member that faces the rim portion of the back surface of the display panel, the protrusion protruding toward the rim portion, and the second adhesive being disposed between the protrusion and the rim portion of the back surface of the display panel, wherein the protrusion has a different shape at a starting point and at an end point at which application of the second adhesive starts and ends, as compared to positions other than the starting point and the end point of the application of the second adhesive, and the protrusion has the different shape in a gap between the starting point and the end point of the second adhesive.

12. The display apparatus according to claim 11, wherein a height of a portion of the protrusion having the different shape in the gap is less than a height of a remainder of the protrusion.

13. The display apparatus according to claim 12, wherein a width of a portion of the protrusion having the different shape in the gap is less than a width of a remainder of the protrusion.

14. The display apparatus according to claim 11, wherein a width of a portion of the protrusion having the different shape in the gap is less than a width of a remainder of the protrusion.

* * * * *